US012728544B2

(12) United States Patent
Frey et al.

(10) Patent No.: US 12,728,544 B2
(45) **Date of Patent: *Sep. 8, 2026**

(54) HANDLING SYSTEM COMPRISING TUBE LIFTER AND MANIPULATOR WITH GEARBOX

(71) Applicant: J.SCHMALZ GMBH, Glatten (DE)

(72) Inventors: Matthias Frey, Sulz-Dürrenmettstetten (DE); Nico Bläse, Horb (DE)

(73) Assignee: J.SCHMALZ GMBH, Glatten (DE)

( * ) Notice: Subject to any disclaimer, the term of this patent is extended or adjusted under 35 U.S.C. 154(b) by 203 days.

This patent is subject to a terminal disclaimer.

(21) Appl. No.: 18/797,153

(22) Filed: Aug. 7, 2024

(65) Prior Publication Data

US 2025/0050511 A1 Feb. 13, 2025

(30) Foreign Application Priority Data

Aug. 8, 2023 (DE) ........................ 102023121122.6

(51) Int. Cl.
*B25J 15/00* (2006.01)
*B25J 15/02* (2006.01)
*B25J 15/06* (2006.01)

(52) U.S. Cl.
CPC ....... *B25J 15/0019* (2013.01); *B25J 15/0213* (2013.01); *B25J 15/0608* (2013.01); *B25J 15/0616* (2013.01)

(58) Field of Classification Search
CPC ................ B25J 15/0019; B25J 15/0213; B25J 15/0608; B25J 15/0616
See application file for complete search history.

(56) References Cited

U.S. PATENT DOCUMENTS 11,685,614 B2 * 6/2023 Truelsen ................ B66C 23/02 414/737
2019/0366426 A1 * 12/2019 Wang .................. B25J 15/0608
(Continued)

FOREIGN PATENT DOCUMENTS

DE 102020133624 A1 6/2022
EP 3720801 B1 10/2020
WO WO-2019110843 A1 6/2019

OTHER PUBLICATIONS

Cobot Lift, "The New Rotating Head", Jan. 18, 2021, youtube.com, Available at URL: https://www.youtube.com/watch?v=G29IHrLH95E.

(Continued)

*Primary Examiner* — Gerald McClain
(74) *Attorney, Agent, or Firm* — PERRY + CURRIER INC.

(57) ABSTRACT

A handling system includes a tube lifter with a lifting tube having a tube interior, and an end effector mounted on the lifting tube and rotatable about an end effector axis of rotation, a manipulator for displacing the end effector, and a coupling device for coupling the tube lifter to the manipulator. The coupling device has a first tube lifter coupling portion and a second manipulator coupling portion, the coupling portions can be connected to one another by a connecting device. The manipulator has a driven rotary element rotatable about a manipulator axis of rotation. The coupling device includes a gearbox configured to translate a rotary movement of the rotary element about the manipulator axis of rotation into a rotary movement of the end effector about the end effector axis of rotation in the connected state of the first and second coupling portions.

14 Claims, 5 Drawing Sheets

(56) References Cited

U.S. PATENT DOCUMENTS

Figure 1:
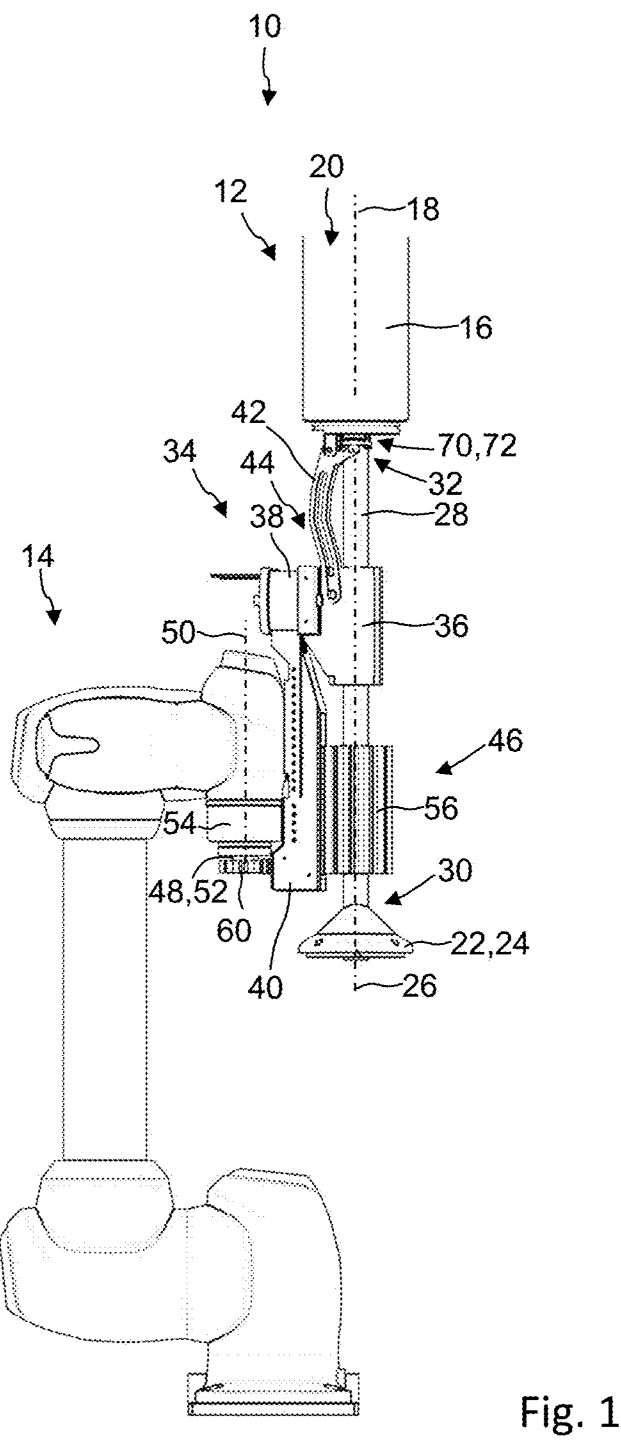

| | | | |
|---|---|---|---|
| 2021/0170574 A1 | 6/2021 | Truelsen | |
| 2021/0237262 A1 | 8/2021 | Holopainen et al. | |
| 2023/0234216 A1 | 7/2023 | Anderson et al. | |
| 2025/0050506 A1* | 2/2025 | Frey | B66C 1/0293 |

OTHER PUBLICATIONS

Cobot Lift, "Cobot Lift Explained", Mar. 24, 2020, youtube/com, Available at URL: https://www.youtube.com/watch?v=oNo0gTOfeY0.

* cited by examiner

HANDLING SYSTEM COMPRISING TUBE LIFTER AND MANIPULATOR WITH GEARBOX

The invention relates to a handling system comprising a tube lifter and a manipulator for moving the tube lifter.

Tube lifters are vacuum handling devices by means of which loads can be lifted, optionally moved and then set down again by means of a vacuum. The lifting movement is exerted by means of a lifting tube which can be shortened by applying a vacuum to the tube interior thereof and can be extended again by releasing the vacuum prevailing therein. An end effector for gripping an object is usually arranged at one end of the lifting tube, in particular in the form of a suction gripping device.

Tube lifters with lifting tube and suction gripping device are known, for example, from EP3078620A1 or from EP3904269A1.

Such tube lifters are usually operated manually, for example via an operating device arranged on the lifting tube, by means of which the lifting tube can be moved and a vacuum supply to the lifting tube can be controlled.

Handling systems are also known in which a tube lifter can be moved automatically by means of a robot. However, in this case, the degrees of freedom of movement of the end effector are usually limited.

The present invention is based on the object of designing a handling system of the type mentioned above so that it can be operated flexibly and safely in an automated manner.

This object is achieved according to the invention by a handling system having the features of claim 1. The handling system is designed for handling objects, in particular for lifting, moving, and setting down an object.

The handling system includes a tube lifter. The tube lifter comprises a lifting tube and an end effector for gripping an object, in particular a suction gripping device. The lifting tube extends along a lifting tube longitudinal axis and has a tube interior. The lifting tube can be shortened by applying a vacuum to the tube interior and can be extended again by ventilating the tube interior (i.e., by flowing air, in particular ambient air, into the tube interior). The handling system can also comprise a vacuum generating device for supplying the tube lifter with negative pressure. Preferably, the end effector, in particular when designed as a suction gripping device, can be supplied with negative pressure through the tube interior of the lifting tube. For example, the lifting tube can be attached to a support or a building ceiling at an end facing away from the end effector so that it hangs vertically downward.

The end effector is held, in particular mounted, on the lifting tube so as to be rotatable about an end effector axis of rotation which is preferably parallel or concentric to the lifting tube longitudinal axis. In this respect, the end effector can be rotated relative to the lifting tube about the end effector axis of rotation.

The handling system also comprises a manipulator for displacing the end effector, in particular in a plane orthogonal to the axis of rotation of the end effector, preferably a horizontal plane. As explained below, the manipulator can also be designed to control the lifting tube. Preferably, the manipulator is a robot, more preferably a collaborative robot (cobot).

The handling system also comprises a coupling device by means of which the tube lifter can be coupled to the manipulator, in particular in a repeatedly detachable manner. The coupling device has a lifting tube-side first coupling portion and a manipulator-side second coupling portion. The second coupling portion on the manipulator side is, in particular, connected to the manipulator, e.g., a robot arm, preferably firmly.

The coupling device also comprises a connecting device by means of which the first and the second coupling portion can be connected or are connected to one another, preferably in a repeatably detachable manner. In the connected state of the first and second coupling portions, the tube lifter and manipulator preferably form a movement unit in such a manner that a displacement movement of the manipulator in a plane orthogonal to the end effector axis of rotation is transferred into a corresponding displacement movement of the tube lifter.

The manipulator comprises a driven rotary element which can rotate about a manipulator axis of rotation. In particular, the rotary element can be driven or formed by a driven manipulator rotary axis, in particular a robot axis.

The coupling device also comprises a gearbox which is designed to translate a rotary movement of the rotary element about the manipulator axis of rotation into a rotary movement of the end effector about the end effector axis of rotation in the connected state of the first and second coupling portions (i.e., when the first coupling portion and the second coupling portion are connected by means of the connecting device), preferably without the first and second coupling portions being displaced. In this respect, the gearbox is in particular designed to transmit a torque between the rotary element and the end effector.

Preferably, the gearbox is designed such that a rotational movement of the end effector about the end effector axis of rotation is decoupled from a movement of the first and second coupling portions. In other words, the gearbox is designed in particular such that a rotational movement of the rotary element about the manipulator axis of rotation is not translated into a displacement movement of the first and second coupling portions. In this respect, the gearbox is designed in particular in such a way that a rotary movement of the end effector about the end effector axis of rotation can be driven by the rotary element, even when the first and second coupling portions are stationary (and therefore when the lifting tube is stationary).

In the proposed handling system, an axis of rotation of the manipulator is used to drive a rotational movement of the end effector and therefore a rotational movement of an object held by the end effector. Thus, it is in particular not necessary to provide additional drive devices on the tube lifter to rotate the end effector, which promotes a cost-effective design. In addition, the weight force on the tube lifter can be reduced in this way so that additional lifting power can be provided for the object to be gripped (since this does not have to be used for an additional drive device). Because a rotational movement of the end effector about the end effector axis of rotation is preferably decoupled from a displacement movement of the first and second coupling portions, it is possible to rotate the end effector, and therefore an object held thereon, about the end effector axis of rotation with the first and second coupling portions fixed (and therefore a fixed position in space). In this way, a held object can be rotated into a desired position, for example after approaching a storage position. In particular, the proposed solution makes it possible to realize a rotational movement over wide angular ranges, in particular rotations about the end effector axis of rotation of 360° and more.

In the proposed handling device, a lifting force is provided, preferably exclusively, by the lifting tube. The manipulator preferably serves only to position the end effector in a plane orthogonal to the end effector axis of rotation (xy plane) and to drive a rotational movement of the end effector about the end effector axis of rotation.

In an advantageous embodiment, the manipulator can be designed as a robot with a robot arm and a robot wrist. The rotary element can then be driven or provided in particular by an axis of rotation of the robot wrist. Advantageously, the manipulator can be a 6-axis robot, in particular a collaborative 6-axis robot. In particular, the rotary element can be driven or formed by the last axis of the robot along the kinematic chain, or in the case of a 6-axis robot, by the sixth axis.

Within the scope of an advantageous implementation of the gearbox, the gearbox can comprise a first end effector gearbox element and a second manipulator gearbox element. The end-effector-side first transmission element is, in particular, coupled to the end effector in such a way that a rotational movement of the first transmission element is transferred into a rotational movement of the end effector about the end effector axis of rotation. Preferably, the first transmission element is coupled to the end effector so that it cannot rotate about the end effector axis of rotation. The manipulator-side second transmission element is drivable or driven in particular by the rotary element of the manipulator.

The first and the second transmission element are preferably designed such that they engage with one another in the connected state of the first and second coupling portions (i.e., when the first and second coupling portions are connected to one another via the connecting device), in particular such that a torque can be transmitted between the first transmission element and the second transmission element.

In order to facilitate repeated coupling and uncoupling of the manipulator to the tube lifter, it may also be advantageous if the first transmission element and the second transmission element are designed such that they can be repeatedly brought into and out of engagement, in particular by a translational displacement relative to one another, preferably along a direction orthogonal to the end effector axis of rotation.

Within the context of a preferred form of realization, the first gearbox element and the second gearbox element can each be designed as a gear. In this respect, the gearbox can comprise a first gear on the end effector side, which is preferably coupled to the end effector so that it cannot rotate about the end effector axis of rotation, and a second gear on the manipulator side, which can be driven by the rotary element of the manipulator, wherein the first gear and the second gear mesh with one another in the connected state of the first and second coupling portions, i.e., are in meshing engagement with one another. Designing the gearbox as a gear transmission enables particularly reliable and precise power transmission. In addition, designing the transmission elements as gears enables an easily detachable coupling between the first and second transmission elements.

In an alternative advantageous embodiment, it is also conceivable that the transmission elements are designed as friction wheels.

Furthermore, it can be advantageous if the gearbox also has a third transmission element (in particular a third gear) on the manipulator side, which is coupled to the rotary element such that it cannot rotate about the manipulator axis of rotation. The third transmission element (in particular the third gear) is therefore in particular capable of rotation about the manipulator axis of rotation. The third transmission element (third gear) can be in engagement, in particular meshing engagement, with the second transmission element (second gear) in such a way that the second transmission element (second gear) can be driven by the third transmission element (third gear). The second transmission element is designed in particular to transmit a rotary movement of the third transmission element to the first transmission element. In such an embodiment, the second transmission element (second gear) is then preferably arranged between the first transmission element (first gear) and the third transmission element (third gear). Such a design makes it possible to realize a gearbox ratio in a simple constructive manner while maintaining the direction of rotation.

Within the scope of an advantageous further development, the first tube lifter coupling portion can be axially displaceable relative to the lifting tube along the end effector axis of rotation, in particular between a first end position close to the lifting tube and a second end position remote from the lifting tube. Such a design makes it possible to provide additional functionality, e.g., control of the tube lifter, by displacing the first coupling portion along the end effector axis of rotation (see below). In particular, the first coupling portion can be mounted on the lifting tube so as to be axially displaceable relative to the lifting tube along the end effector axis of rotation.

Accordingly, the coupling device can in particular be designed such that—in the connected state of the first and second coupling portions-a displacement movement of the manipulator-side second coupling portion in a displacement plane orthogonal to the end effector axis of rotation (as a result of a movement of the manipulator) is transferred into a movement of the lifting tube in this displacement plane, but a displacement movement of the manipulator-side second coupling portion in an axis parallel to the end effector axis of rotation (i.e., orthogonal to the displacement plane) is not transferred into a displacement movement of the lifting tube.

In this context, it can also be advantageous if the gearbox is designed such that the end-effector-side first gearbox element has a longitudinal extension along the end effector axis of rotation such that the second gearbox element can be displaced axially along the end effector axis of rotation relative to the first gearbox element, even when the second gearbox element is in engagement with the first gearbox element (i.e., when the first coupling portion is connected to the second coupling portion). Such a configuration facilitates axial displacement of the first coupling portion along the end effector axis of rotation while simultaneously transmitting a rotational movement about the end effector axis of rotation. The first tube lifter coupling portion can therefore be displaced axially along the end effector axis of rotation relative to the first end effector gearbox element (first gear). If the gearbox is designed as a gear transmission, the first gear can have a longitudinal extension along the end effector axis of rotation such that the second gear in the meshing state can be displaced axially along the end effector axis of rotation relative to the first gear. Preferably, a longitudinal extension of the first transmission element (first gear) along the end effector axis of rotation is at least twice as large as an extension of the second transmission element along the end effector axis of rotation, in particular at least three times as large, further in particular at least four times as large, further in particular at least five times as large.

As mentioned above, a control function for the tube lifter can be realized by displacing the tube lifter side coupling portion along the end effector axis of rotation. For example, the tube lifter (also independent of the adjustability of the first coupling portion) can have a valve device for controlling flow connections, in particular for controlling a flow connection between the tube interior and an environment and/or a flow connection between the tube interior and the end effector (suction gripping device). The first coupling portion can interact with the valve device in such a way that the valve device can be actuated, in particular controlled, by moving the first coupling portion along the end effector axis of rotation. Such a design accordingly makes it possible to actuate or control the valve device by a displacement movement of the manipulator (transferred to the valve device via the coupling device).

In particular, the valve device can have a lifting tube ventilation valve for ventilating the interior of the lifting tube. The lifting tube ventilation valve can be designed in particular to control an inflow of ambient air into the tube interior and thus a change in the length of the lifting tube. The first coupling portion can then interact with the lifting tube ventilation valve in such a way that, by moving the first coupling portion along the end effector axis of rotation, a ventilation position of the lifting tube ventilation valve can be changed; in particular, the lifting tube ventilation valve can be selectively (partially or completely) opened or (partially or completely) closed. In this respect, a shortening or lengthening of the lifting tube along the lifting tube longitudinal axis can be controlled by moving the first coupling portion along the end effector axis of rotation. Such a design allows control of a length of the lifting tube, in particular of a lifting force exerted by the lifting tube by movement of the manipulator, which allows automated operation.

In this context, it can also be advantageous if the first coupling portion and the lifting tube ventilation valve are coupled to one another in such a way that a displacement of the first coupling portion by a control distance along the end effector axis of rotation changes a ventilation position of the lifting tube ventilation valve in such a way (i.e., leads to aeration or deaeration of the lifting tube in such a way) that the lifting tube (when the tube interior is subjected to negative pressure) is shortened or lengthened along its lifting tube longitudinal axis by a stroke distance corresponding to the control distance or proportional to the control distance, preferably and is held in one of these positions (floating position). This makes it easier for a load to be taken up by the lifting tube and not by the manipulator.

In the context of a particularly advantageous embodiment, the first coupling portion can be coupled to the valve device, in particular the lifting tube ventilation valve, via a control lever. The control lever can preferably be pivotably mounted on the lifting tube about a control lever pivot axis. The control lever preferably has an actuating portion which interacts with the valve device, in particular the lifting tube ventilation valve, further in particular with a valve body of the lifting tube ventilation valve, in particular in such a way that the valve device, in particular the lifting tube ventilation valve, can be actuated by pivoting the control lever about the control lever pivot axis. The control lever and the first coupling portion can in particular interact in such a way that the control lever can be pivoted about the control lever pivot axis by axial displacement of the first coupling portion along the end effector axis of rotation. In this respect, the valve device or the lifting tube ventilation valve can be actuated by axial displacement of the first coupling portion along the end effector axis of rotation. Such a design with a control lever allows a structurally simple, yet robust and reliable control option during operation. In addition, the proposed solution also makes it possible to map non-linear actuation processes of the valve device by appropriately designing the control lever.

A particularly advantageous form of realization can be if the control lever has a control curve, for example in the form of a control slot. The control curve can be formed, for example, by a local recess or an elongated hole in the control lever. At least one control element, for example in the form of a pin, bolt, or screw, can then be provided on the first coupling portion, which element engages in the control curve of the control lever. In this way, the control curve can form a guide for the control element. The control curve is preferably designed such that, depending on a position of the control element along the control curve, a pivoting position of the control lever about the control lever pivot axis (and therefore a valve position of the valve device or a ventilation position of the lifting tube ventilation valve) can be adjusted. Such a design of the control curve makes it possible, by designing a shape of the control curve, to realize even complex, in particular non-linear, controllings of the valve device, in particular ventilation positions of the lifting tube ventilation valve, in a structurally simple manner.

Advantageously, the control curve can have a plurality of differently designed control curve portions. For example, the control curve can have a first control curve portion and a second control curve portion adjoining the first control curve portion. For example, it is conceivable that the control curve has a first control curve portion and at least one second control curve portion, wherein the first and the second control curve portion are designed such that when the control element is displaced by a control distance along the end effector axis of rotation, the control lever is pivoted when the control element is received in the first control curve portion, and by a larger angular range about the control lever pivot axis than when the control element is received in the second control curve portion. In this way, different valve controllings can be provided by moving the control element in different portions of the control curve, for example in order to be able to map a different response behavior of the lifting tube when moving with and without an object.

In an advantageous embodiment, the control curve can have at least two, preferably three, more preferably four, control curve portions, which are formed at an angle to one another, but are themselves preferably straight. In particular, the control curve portions can merge into one another. Depending on the inclination or gradient relative to the end effector axis of rotation, a response behavior of the valve device, in particular an opening speed of the lifting tube ventilation valve, can then be different.

In particular, the control curve can be designed such that the valve device, in particular the lifting tube ventilation valve, is in a first valve position, in particular first ventilation position, when the control element is in a first control curve portion of the control curve, and is in a second valve position, in particular second ventilation position, when the control element is in a second control curve portion of the control curve. In particular, the valve device, in particular the lifting tube ventilation valve, is further open in the first valve position than in the second valve position. For example, it is conceivable that the ventilation valve is completely or partially open in the first valve position and closed or partially open in the second ventilation position. The first control curve portion can, in particular, be a first end portion of the control curve. The second control curve portion can, in particular, be a second end portion of the control curve.

In an advantageous further development, the first coupling portion can be held on the lifting tube via the control lever, for example by engaging the control element in the control curve. In this respect, an end position of the first coupling portion spaced apart from the lifting tube can be defined, for example, by an end position of the control element in the control curve.

In an advantageous further development, the first coupling portion can be held on the lifting tube in such a way that, when the first and second coupling portions are separated (i.e., when the first and second coupling portions are not connected by means of the connecting device), it is in a rest configuration along the end effector axis of rotation or is transferred into this configuration due to gravity. Preferably, in this rest configuration, the first coupling portion interacts with the valve device, in particular the lifting tube ventilation valve, via the control lever in such a way (in particular, the control lever is pivoted about the control lever pivot axis in the rest configuration of the first coupling portion in such a way) that the valve device, in particular the lifting tube ventilation valve, is at least partially opened, in particular in such a way that the lifting tube is extended. In a design with a control curve, it is in particular conceivable that, in the rest configuration of the first coupling portion, the control element is located in the above-mentioned first end portion of the control curve. In particular, in the rest configuration, the lifting tube ventilation valve can be opened in such a way that the lifting tube extends slowly or is held in a predetermined floating position, which promotes safe operation of the handling system, even in the event of a power failure.

An advantageous design of the handling system can be that the end effector is connected to the lifting tube via a connecting rod. The connecting rod can, in particular, define the end effector axis of rotation. The connecting rod is preferably connected to the end effector at one end in a rotationally fixed manner and to the lifting tube at the other end so that it can rotate about the end effector axis of rotation. Such a connecting rod can serve, in particular, as a point of engagement for the manipulator. Advantageously, the first coupling portion can be arranged between the first end and the second end of the connecting rod.

In this context, it can be particularly advantageous if the first coupling portion is arranged on the connecting rod in such a way, in particular surrounds the connecting rod in such a way, that the connecting rod and the first coupling portion can be displaced translationally (axially) along the end effector axis of rotation, as well rotationally about the end effector axis of rotation, relative to each other, but preferably the connecting rod and the first coupling portion interact in a positively fitting manner in a direction orthogonal to the end effector axis of rotation. Here movements of the first coupling portion along the end effector axis of rotation are, in particular, not transmitted to the connecting rod, but movement of the first coupling portion orthogonal to the end effector axis of rotation preferably are. In particular, the first coupling portion can be rotatably mounted on the connecting rod. For example, the first coupling portion may comprise a ball bearing via which the first coupling portion is mounted on the connecting rod.

In a design with a connecting rod, it can also be advantageous if a rotational movement of the rotary element about the manipulator axis of rotation is transmitted to the end effector via the connecting rod. For example, the first end-effector-side transmission element (first gear) can be arranged coaxially to the connecting rod and/or connected to the connecting rod so that it cannot rotate about the end effector axis of rotation. The first transmission element (first gear) can advantageously extend axially along a longitudinal extension of the connecting rod. In particular, a gear axis and a longitudinal axis of the connecting rod can be collinear with each other.

An advantageous further development can be that the connecting rod has an integrated fluid guide, in particular a vacuum guide, for supplying the end effector with fluid, in particular vacuum. The fluid guide preferably extends from the first end of the connecting rod to the second end, i.e., in particular from the lifting tube to the end effector. The fluid guide is preferably fluidically connected at one end to the interior of the lifting tube and at the other end to the end effector. Such a design makes it possible to supply the end effector with negative pressure through the connecting rod, which can, for example, reduce interfering contours caused by external fluid lines. For example, the connecting rod can be designed as a connecting tube with an internal fluid guide.

As mentioned above, the proposed design allows automated control of the tube lifter. In this context, it is also advantageous if the coupling device or the connecting device is designed to automatically uncouple the manipulator from the tube lifter as required, in particular in an emergency situation, such as a power failure. This makes it possible, for example, for the manipulator, when uncoupled, to automatically move into a safety configuration, which poses no danger to a person who may be in the same work area. In this way, a safety function can be provided, in particular without external safety measures (e.g., protective fences around a handling system or an uninterruptible power supply) additionally being absolutely necessary.

This can be advantageously realized by designing the connecting device to be controllable in such a way that it can be selectively activated or deactivated, in particular repeatedly activated, deactivated and reactivated. In this respect, the connecting device can be controlled in particular in such a way that a connecting effect of the connecting device that couples the first coupling portion and the second coupling portion to one another can be selectively activated or deactivated, in particular can be activated, deactivated and reactivated. In particular, the connecting device is designed such that, in the activated state, the first and the second coupling portion are connected to one another, and, in the deactivated state, the first and the second coupling portion can be detached from one another without tools. The handling system can then preferably have a controller for controlling the connecting device. The controller can in particular be a manipulator controller, in particular a robot controller. It is also conceivable that the controller is an external controller, e.g. as part of a higher-level controlling of the handling system.

An advantageous embodiment of the connecting device can be that the connecting device has at least one electromagnet that can be activated or deactivated as required. The at least one electromagnet is preferably designed such that in an activated, in particular energized, operating state of the at least one electromagnet, the first and the second coupling portion are connected to one another, and in a deactivated, in particular non-energized, operating state of the at least one electromagnet, the first and the second coupling portion can be detached from one another in particular without tools. In this way, a safety function is created in a simple constructive manner, since in the event of a power failure, the magnetic effect of the at least one electromagnet automatically decreases, and the first and second coupling portions (and consequently the manipulator and tube lifter) are thus automatically separated from one another. It is possible that the first and the second coupling portion are directly connected to each other in the activated operating state by the magnetic force of the electromagnet. It is also conceivable that the electromagnet actuates a connecting device. The at least one electromagnet can be arranged on the first coupling portion and/or on the second coupling portion.

In this context, it may also be advantageous if the connecting device has an energy storage device, e.g. a capacitor. The energy storage device is designed in particular to supply the at least one electromagnet with the energy required to maintain the activated operating state at least for a short time. This makes it possible to keep the at least one electromagnet in the activated (energized) operating state (and thus the first and second coupling portions in the connected state) for a certain time even in the event of a power failure, e.g. until the manipulator or robot has moved into a safety position. The energy storage unit can be arranged on the manipulator side or on the tube lifter side.

Figure 2A:
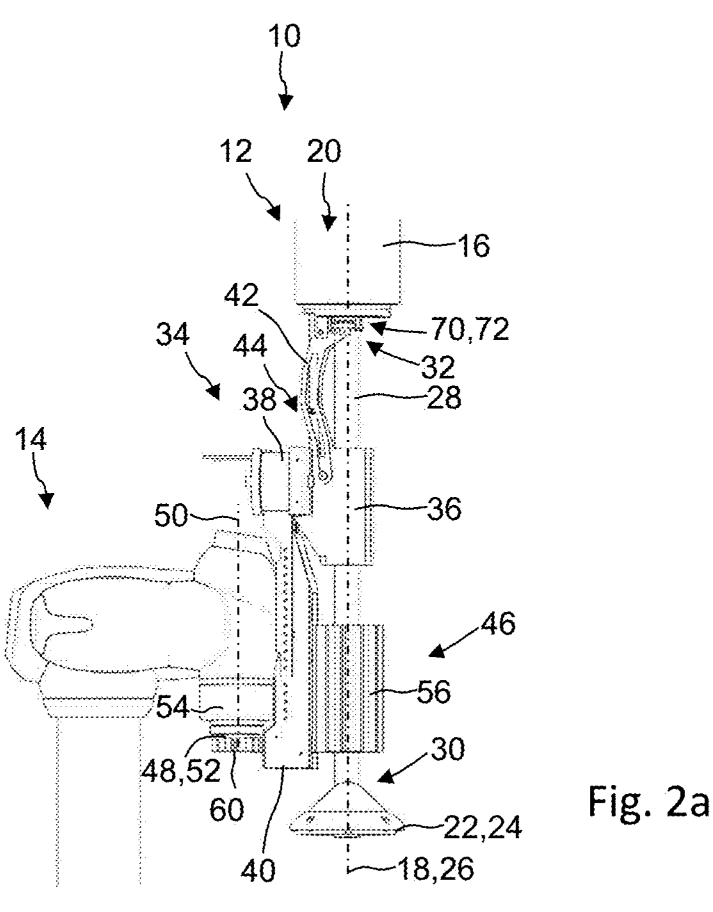
Figure 2B:
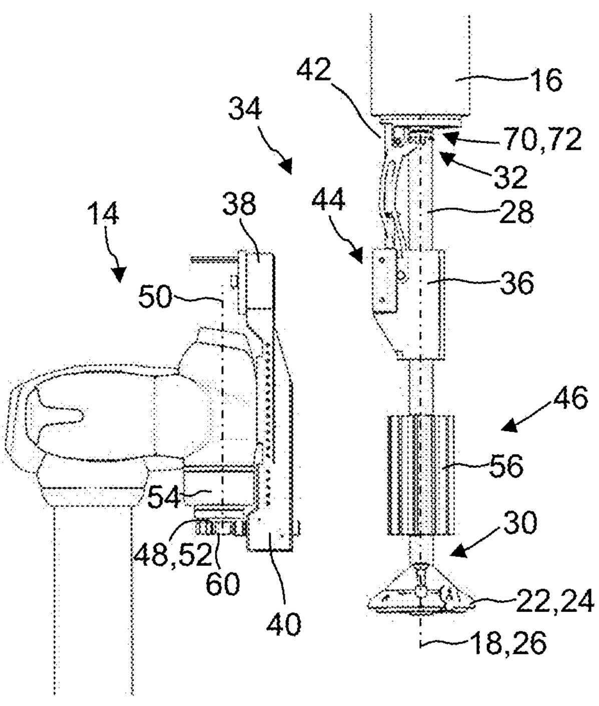
Figure 3A:
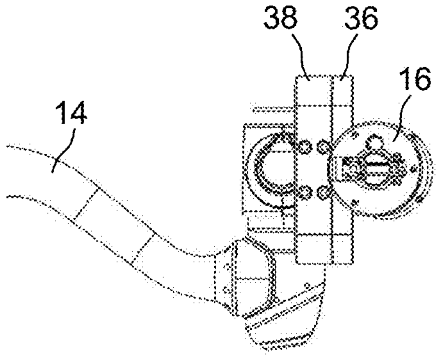
Figure 3B:
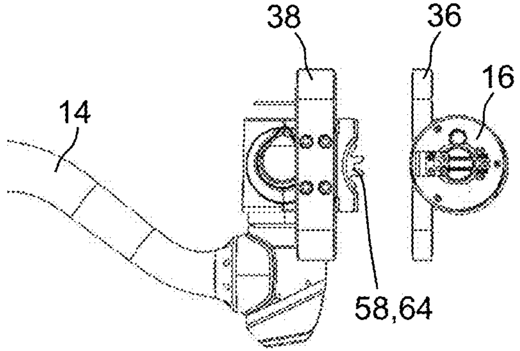
Figure 4:
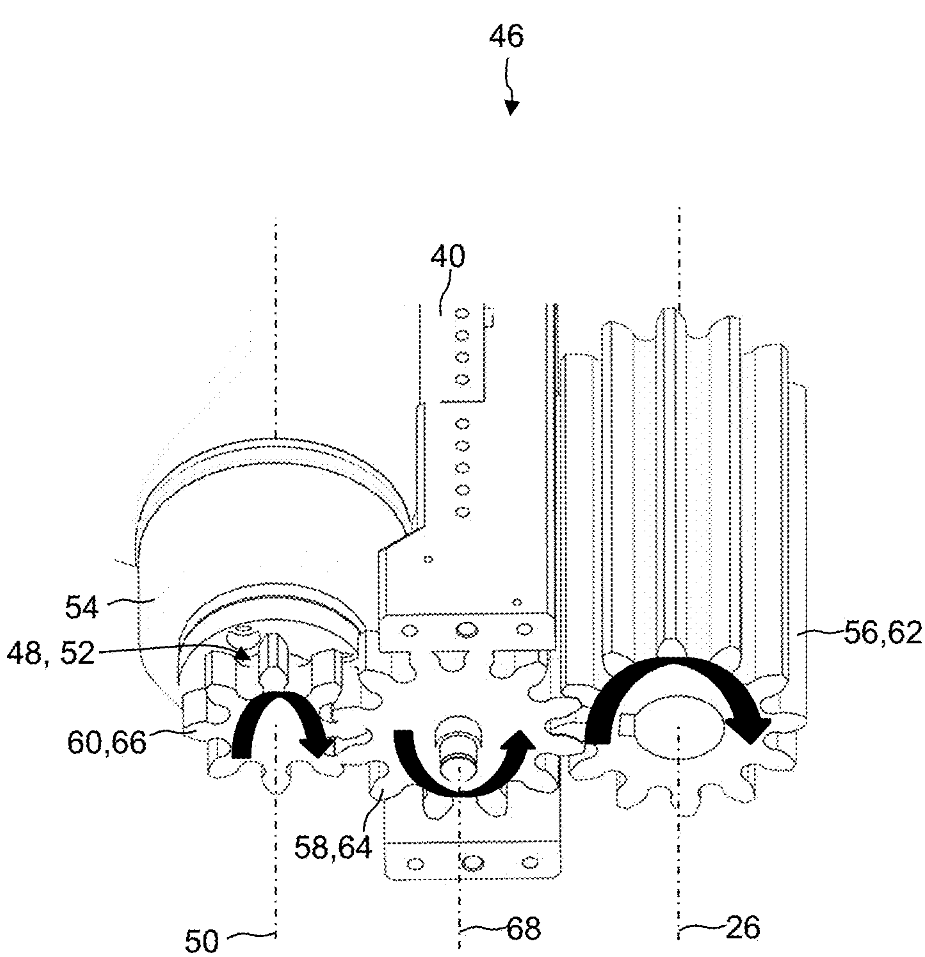
Figure 5:
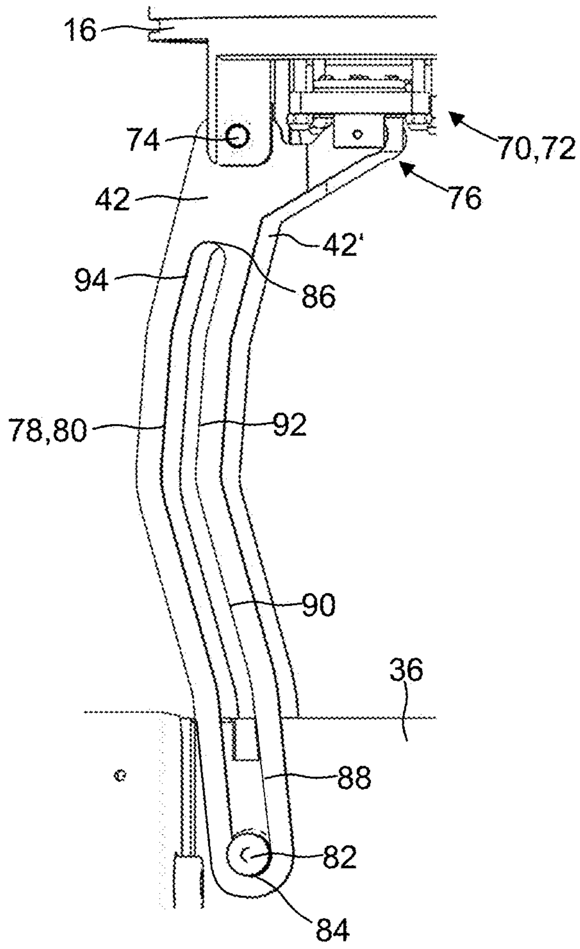

The invention is explained in more detail below with reference to the figures. In the figures:

FIG. 1 is a sketched representation of an embodiment of a handling system with tube lifter and manipulator;

FIG. 2*a-b* are sketched representations of the handling system according to FIG. 1 with the tube lifter coupled (view a) and with the tube lifter uncoupled (view b) in a side view;

FIG. 3*a-b* are sketched representations of the handling system according to FIG. 1 with the tube lifter coupled (view a) and with the tube lifter uncoupled (view b) in a plan view;

FIG. 4 is a detailed view of the handling system according to FIG. 1 to explain the gearbox; and FIG. 5 is a detailed view of the handling system according to FIG. 1 in the region of the control lever.

In the following description and in the figures, identical reference signs are in each case used for identical or corresponding features.

FIG. 1 shows a handling system, which is denoted as a whole by reference sign 10. The handling system 10 comprises a tube lifter 12 and a manipulator 14.

The manipulator 14 is designed as a robot, preferably as a collaborative robot. In the example shown, the manipulator 14 is designed as a 6-axis robot.

The tube lifter 12 comprises a lifting tube 16, which extends along a lifting tube longitudinal axis 18. The lifting tube 16 encloses a tube interior 20. The lifting tube 16 can be shortened by applying a vacuum to the tube interior 20 and can be extended again by ventilating the tube interior 20. For this purpose, the handling system 10 can comprise a vacuum generating device (not shown).

The tube lifter 12 also comprises an end effector 22 for gripping an object. In the example shown, the end effector 22 is designed as a suction gripping device 24 for suctioning onto an object (not shown).

The end effector 22 is rotatable relative to the lifting tube 16 about an end effector axis of rotation 26 which, in the example, is collinear with the lifting tube longitudinal axis 18.

By way of example and preferably, the end effector 22 is connected to a lower end of the lifting tube 16 via a connecting rod 28. At an upper end (not shown) of the lifting tube 16, it can be connected to a frame or support (not shown).

The connecting rod 28 extends along the end effector axis of rotation 26 (lifting tube longitudinal axis 18). The connecting rod 28 is rotatably coupled to the end effector 22 at a first (lower) end 30 and is rotatably mounted about the end effector axis of rotation 26 on the lifting tube 16 at a second (upper) end 32. In this respect, the connecting rod 28 is rotatable relative to the lifting tube 16 about the end effector axis of rotation 22.

In the example, the connecting rod 28 comprises an internal fluid guide (not visible) for supplying the end effector 22 with negative pressure. The fluid guide extends, for example and preferably, from the first end 30 to the second end 32 of the connecting rod 28, wherein the fluid guide is fluidly connected at the first end 30 to the end effector 22 and at the second end 32 to the tube interior 20 of the lifting tube 16. Thus, the end effector 22 can be supplied with negative pressure through the tube interior 20 of the lifting tube 16 (explained in more detail below). In embodiments not shown, the fluid guide can also run outside the connecting rod 28.

The tube lifter 12 can be coupled to the manipulator 14 via a coupling device 34 so as to be repeatedly detachable. FIG. 1 shows the coupling device 34 in a connected state of manipulator 14 and tube lifter 12.

The coupling device 34 comprises a first coupling portion 36 on the tube lifter side and a second coupling portion 38 on the manipulator side (described in more detail below).

In the example, the first coupling portion 36 is held on the lifting tube 16 via a control lever 42 (explained in more detail below). In embodiments not shown, the first coupling portion 36 can also be connected to the lifting tube 16 in another way, for example by being held on the connecting rod 28. The manipulator-side second coupling portion 38 is preferably firmly connected to the manipulator 14, for example via a mount 40.

As can be seen in FIG. 1, the first coupling portion 36 is, as an example and preferably, arranged between the first end 30 of the connecting rod 28 and the second end 32 of the connecting rod 28. In the specific example, the first coupling portion 36 is arranged on the connecting rod 28 so as to be displaceable both translationally along the end effector axis of rotation 26 and rotationally about the end effector axis of rotation 26.

For example, the first coupling portion 36 encompasses the connecting rod 28 so that the first coupling portion 36 is displaceable along the end effector axis of rotation 26 relative to the connecting rod 28, and, moreover, the connecting rod 28 is rotatable about the end effector axis of rotation 26 relative to the first coupling portion 36. In this respect, a displacement movement of the manipulator 14 in a plane orthogonal to the end effector axis of rotation 26 can be transmitted to the lifting tube 16 (for example, in order to move the end effector 22 to a desired position to deposit a gripped object). A displacement movement of the manipulator 14 along the end effector axis of rotation 26, however, leads to an axial displacement of the first coupling portion 36 relative to the lifting tube 16.

The first and the second coupling portions 36, 38 can be connected to one another via a connecting device 44 so as to be repeatedly detachable, and therefore the manipulator 14 and the tube lifter 12 can be coupled to one another so as to be repeatedly detachable.

In the example shown, the connecting device 44 comprises an electromagnet that can be activated or deactivated as required (for example integrated in the first and/or second coupling portion 36, 38). As mentioned above, the electromagnet is designed and arranged such that, in an activated operating state of the electromagnet, the first and the second coupling portion 36, 38 are connected to one another and, in a deactivated operating state of the electromagnet, the first and the second coupling portion 36, 38 can be detached from one another, in particular without tools. In order to supply the electromagnet with power at least for a short time, even in the event of a power failure, the connecting device 44 can optionally have an energy storage device (not shown), in particular in the form of a capacitor. In embodiments not shown, the connecting device 44 can also comprise other connecting mechanisms.

The coupling device 34 also comprises a gearbox 46 (detail view FIG. 4), which is designed to translate a rotational movement of a rotary element 48 of the manipulator 14 about a manipulator axis of rotation 50 into a rotational movement of the end effector 22 about the end effector axis of rotation 26.

In the example shown, the rotary element 48 is formed by a robot axis of rotation 52 of the wrist 54 of the robot 14. Specifically, the robot axis of rotation 52 is the last axis along the kinematic chain of the robot.

An exemplary and preferred embodiment of the gearbox 46 is explained below with reference to FIG. 4.

As can be seen in FIG. 4, the gearbox 46 comprises a first transmission element 56 on the end effector side, a second transmission element 58 on the manipulator side and a third transmission element 60 on the manipulator side. In the example shown, the transmission elements 56, 58, 60 are each designed as gears. In this respect, the gearbox 46 comprises a first gear 62 on the end effector side, a second gear 64 on the manipulator side and a third gear 66 on the manipulator side. In embodiments not shown, however, it is also conceivable for the transmission elements 54, 56, 58 to be designed in the form of friction wheels.

In the example, the end-effector-side first gear 62 is arranged concentrically around the connecting rod 28 and is connected thereto so that it cannot rotate about the end effector axis of rotation 26. In this respect, a rotational movement of the first gear 62 about the end effector axis of rotation 26 is transferred into a rotational movement of the connecting rod 28 and thus of the end effector 22 about the end effector axis of rotation 26.

The manipulator-side third gear 66 is rotationally fixedly coupled to the rotary element 48 (robot axis of rotation 52) and is thus driven about the manipulator axis of rotation 50.

As shown in FIG. 4, the second gear 64 is designed to transmit a torque between the first gear 62 and the third gear 66. For example, the second gear 64 is held on the second coupling portion 38, in particular the mount 40, about an axis of rotation 68 parallel to the manipulator axis of rotation 50.

In the connected state of the first and second coupling portions 36, 38 (i.e., when the first coupling portion 36 and the second coupling portion 38 are connected to one another by means of the connecting device 44), the first gear 62 and the second gear 64 are in meshing engagement with one another (see FIG. 4), so that a torque can be transmitted between the robot axis of rotation 52 and the end effector 22. As mentioned above, a rotational movement of the end effector 22 about the end effector axis of rotation 26 is decoupled from a movement of the first and second coupling portions 36, 38. In other words, even if the manipulator 14 is otherwise stationary (i.e., without movement of any of the other robot axes), a rotational movement of the end effector 22 about the end effector axis of rotation 26 can be realized.

The first gear 62 and the first coupling portion 36 are displaceable relative to each other along the end effector axis of rotation 26. Since in the connected state of the first and second coupling portions 36, 38, the first coupling portion 36 is motion-coupled to the second gear 64 and the third gear 66, a displacement movement of the manipulator 14 along the end effector axis of rotation 26 leads to a relative movement of the second gear 64 relative to the first gear 62.

Such a relative movement in the meshing state of the gears 62, 64 is realized, for example, in that the first gear 62 has a longitudinal extension along the end effector axis of rotation 26 such that the second gear 64, while maintaining a torque transmission, is displaceable along the end effector axis of rotation 26 relative to the first gear 62 (see FIGS. 1 and 4).

As mentioned above, the first coupling portion 36 in the example is secured to the lifting tube 16 via a control lever 42. The control lever 42 is designed in particular to control a valve device 70 of the lifting tube 16. In embodiments not shown, the handling system 10 can also not have such a valve control function, in particular no control lever 42.

In the specific example, the valve device 70 comprises a lifting tube ventilation valve 72, which is designed to connect the tube interior 20 of the lifting tube 16 to an environment as required and thus to enable ambient air to flow into the tube interior 20. In this way, a change in the length of the lifting tube 16 can be controlled.

The valve device 70 can also comprise an optional end effector ventilation valve (not shown), which is designed to selectively open or close a flow connection between the tube interior 20 and the end effector 22 (in the example through the connecting rod 28).

As shown in FIG. 5, the control lever 42 is mounted on the lifting tube 16 so as to be pivotable about a control lever pivot axis 74. The control lever 42 is coupled to the lifting tube ventilation valve 72 by an actuating portion 76 in such a way that a ventilation position of the lifting tube ventilation valve 72 can be changed by pivoting the control lever 42 about the control lever pivot axis 74.

For example, the lifting tube ventilation valve 72 can be designed as a ventilation flap, the opening angle of which can be changed by changing a pivoting movement of the control lever 42 about the control lever pivot axis 74.

By way of example and preferably, a pivoting movement of the control lever 42 about the control lever pivot axis 74 can be driven by an axial displacement of the first coupling portion 36 along the end effector axis of rotation 26.

Specifically, the control lever 42 comprises a control curve 78, which in the example is designed as a control slot 80 in the form of an elongated hole. As shown in FIG. 5, the first coupling portion 36 engages with a control element 82 in the control curve 78. The control element 82 is designed, for example, in the form of a screw or bolt. In the course of an axial movement of the first coupling portion 36 along the end effector axis of rotation 26 (in FIG. 5 "upward" or "downward"), the control element 82 moves along the control curve 78 between a lowest position shown in FIG. 5 (furthest away from the lifting tube 16 along the end effector axis of rotation 26), in which the control element 82 rests against the lower end 84 of the control curve 78, and an uppermost position (not shown), in which the control element 82 rests against the upper end 86 of the control curve 78.

As shown in FIG. 5, the control curve 78 has an angled course, so that an axial movement of the first coupling portion 36 along the end effector axis of rotation 26 is translated into a pivoting movement of the control lever 42 about the control lever pivot axis 74, and in this way, the valve device 70 is actuated.

In the specific example, the control curve 78 has a first control curve portion 88, a second control curve portion 90 adjoining the first control curve portion 88, a third control curve portion 92 adjoining the second control curve portion 90, and a fourth control curve portion 94 adjoining the third control curve portion 92. As can be seen from FIG. 5, the control curve portions 88, 90, 92, 94 are arranged at an angle to one another, but are themselves preferably straight.

Depending on an inclination of the particular control curve portion 88, 90, 92, 94 relative to the end effector axis of rotation 26, a displacement of the first coupling portion 36 along the end effector axis of rotation 26 leads to a more or less rapid opening or closing movement of the lifting tube ventilation valve 72.

In the example shown (see FIG. 5), a further control lever 42' is provided, which is designed analogously to the first control lever 42. In embodiments not shown, the further control lever 42' can also be designed differently, for example can have a differently shaped control curve 78. In other embodiments not shown, however, it may also be that only one control lever 42 is provided.

The invention claimed is:

1. A handling system, comprising:

a tube lifter with a lifting tube which has a tube interior and with an end effector, which is mounted on the lifting tube so as to be rotatable about an end effector axis of rotation, wherein the lifting tube is attached to a support or a building ceiling at an end facing away from the end effector;

a manipulator for displacing the end effector;

a coupling device for coupling the tube lifter to the manipulator, wherein the coupling device has a first coupling portion on the tube lifter side and a second coupling portion on the manipulator side, wherein the first and the second coupling portions can be connected to one another by a connecting device;

wherein the manipulator has a driven rotary element which is rotatable about a manipulator axis of rotation, wherein the coupling device comprises a gearbox which configured to translate a rotary movement of the rotary element about the manipulator axis of rotation into a rotary movement of the end effector about the end effector axis of rotation in the connected state of the first and second coupling portions, wherein the gearbox is configured such that a rotational movement of the end effector about the end effector axis of rotation is decoupled from a movement of the first and second coupling portions.

2. The handling system according to claim 1, wherein the manipulator is configured as a robot with a robot arm and a robot wrist, wherein the rotary element is driven by a robot axis of rotation of the robot wrist.

3. The handling system according to claim 1, the gearbox comprising:

an end-effector-side first gearbox element which is coupled to the end effector so that it cannot rotate about the end effector axis of rotation, and a manipulator-side second gearbox element which is driven via the rotary element of the manipulator, wherein the first gearbox element and the second gearbox element are in engagement with one another in the connected state of the first and second coupling portions.

4. The handling system according to claim 3, the gearbox further comprising a manipulator-side third transmission element which is coupled to the rotary element in a rotationally fixed manner and is in engagement with the second transmission element such that the second transmission element can be driven by the third transmission element.

5. The handling system according to claim 3, wherein the first gearbox element has a longitudinal extension along the end effector axis of rotation such that the second gearbox element in engagement is displaceable axially along the end effector axis of rotation relative to the first gearbox element.

6. The handling system according to claim 1, wherein the first coupling portion is axially displaceable relative to the lifting tube along the end effector axis of rotation.

7. The handling system according to claim 6, wherein the tube lifter has a valve device for controlling flow connections wherein the first coupling portion cooperates with the valve device in such a way that the valve device can be actuated, in particular controllably, by moving the first coupling portion along the end effector axis of rotation.

8. The handling system according to claim 7, wherein the valve device has a lifting tube ventilation valve for ventilating the tube interior, wherein the first coupling portion interacts with the lifting tube ventilation valve in such a way that, by displacing the first coupling portion along the end effector axis of rotation, a ventilation position of the lifting tube ventilation valve can be changed.

9. The handling system according to claim 7, wherein the first coupling portion is coupled to the valve device via a control lever, wherein the control lever is mounted on the lifting tube so as to be pivotable about a control lever pivot axis, wherein the control lever has an actuating portion which interacts with the valve device in such a way that the valve device can be actuated by pivoting the control lever about the control lever pivot axis, wherein the control lever can be pivoted about the control lever pivot axis by axial displacement of the first coupling portion along the end effector axis of rotation.

10. The handling system according to claim 9, wherein the control lever has a control curve wherein at least one control element is provided on the first coupling portion, which element engages in the control curve, wherein a pivot position of the control lever about the control lever pivot axis, and therefore a valve position of the valve device is adjustable depending on a position of the control element along the control curve.

11. The handling system according to claim 1, wherein the end effector is connected to the lifting tube via a connecting rod, wherein the connecting rod is connected to the end effector at a first end in a rotationally fixed manner and is connected to the lifting tube at a second end so as to be rotatable about the end effector axis of rotation, wherein the first coupling portion is arranged between the first end and the second end of the connecting rod.

12. The handling system according to claim 11, wherein the first coupling portion surrounds the connecting rod in such a way that the connecting rod and the first coupling portion can be displaced relative to one another both translationally along the end effector axis of rotation and rotationally about the end effector axis of rotation.

13. The handling system according to claim 11, the gearbox comprising:

an end-effector-side first gearbox element which is coupled to the end effector so that it cannot rotate about the end effector axis of rotation, and a manipulator-side second gearbox element which is driven via the rotary element of the manipulator, wherein the first gearbox element and the second gearbox element are in engagement with one another in the connected state of the first and second coupling portions, wherein the first gearbox element is arranged coaxially to the connecting rod and/or is connected to the connecting rod in a rotationally fixed manner.

14. The handling system according to claim 1, wherein the connecting device is configured to be controllable in such a way that it can be selectively activated or deactivated, wherein a controller is provided for controlling the connecting device.

* * * * *